(12) United States Patent
Lee et al.

(10) Patent No.: US 8,521,799 B2
(45) Date of Patent: Aug. 27, 2013

(54) ROW-VECTOR NORM COMPARISON METHOD AND ROW-VECTOR NORM COMPARISON APPARATUS FOR INVERSE MATRIX

(75) Inventors: Young Ha Lee, Daejeon (KR); Seung Jae Bahng, Daejeon (KR); Youn-Ok Park, Daejeon (KR)

(73) Assignees: Samsung Electronics Co., Ltd., Suwon-Si (KR); Electronics and Telecommunications Research Institute, Daejeon (KR)

( * ) Notice: Subject to any disclaimer, the term of this patent is extended or adjusted under 35 U.S.C. 154(b) by 1458 days.

(21) Appl. No.: 12/165,209

(22) Filed: Jun. 30, 2008

(65) Prior Publication Data

US 2009/0157787 A1  Jun. 18, 2009

(30) Foreign Application Priority Data

Dec. 18, 2007  (KR) .................. 10-2007-0133663

(51) Int. Cl.
*G06F 7/32* (2006.01)
*G06F 7/38* (2006.01)

(52) U.S. Cl.
USPC .......................................... 708/520; 708/514

(58) Field of Classification Search
USPC .................. 375/260–267; 708/514, 520, 607
See application file for complete search history.

(56) References Cited

U.S. PATENT DOCUMENTS

| | | | |
|---|---|---|---|
| 5,923,712 A * | 7/1999 | Leyendecker et al. | 375/297 |
| 2003/0053524 A1* | 3/2003 | Dent | 375/148 |
| 2003/0054828 A1* | 3/2003 | Dent | 455/450 |
| 2003/0092456 A1* | 5/2003 | Dent | 455/503 |

(Continued)

FOREIGN PATENT DOCUMENTS

| | | |
|---|---|---|
| KR | 10-2001-0012173 A | 2/2001 |
| KR | 10-2004-0053435 A | 6/2004 |
| KR | 10-2005-0061754 A | 6/2005 |
| WO | 98/51047 | 11/1998 |

OTHER PUBLICATIONS

M. Borgmann and H. Bolcskei, "Interpolation-based efficient matrix inversion for MIMO-OFDM receivers," in Proc. IEEE Asilomar Conf. on Signals, Systems, and Comp., vol. 2, Nov. 2004, pp. 1941-1947.*

(Continued)

*Primary Examiner* — Chat Do
*Assistant Examiner* — Matthew Sandifer
(74) *Attorney, Agent, or Firm* — Jefferson IP Law, LLP

(57) ABSTRACT

Disclosed are a row-vector norm comparison method and a row-vector norm comparison apparatus for an inverse matrix. A row-vector norm comparison apparatus includes: an input matrix processing module that receives and combines constituent elements of a matrix; a cofactor operation module that multiplexes the combination result of the constituent elements to calculate factors constituting an adjoint matrix; a square calculation module that squares the calculated factors; a summation module that selects a predetermined number of factors among the squared factors and sums the selected factors to calculate the norms of row vectors in an inverse matrix; and a norm comparison module that outputs a comparison result of the calculated norms of the row vectors. A row-vector norm comparison method includes: combining constituent elements of a matrix to generates a plurality of combination results of the constituent elements; multiplexing the combination results to calculate factors constituting an adjoint matrix of the matrix; squaring the calculated factors and selectively summing the squared factors; and calculating the norms of row vectors in an inverse matrix and comparing the calculated norms of the row vectors. With this configuration, row-vector norm comparison for an inverse matrix can be performed with a design structure. Therefore, it is not necessary to use an existing complex operation method. In addition, low power consumption of the multiple antenna system can be achieved, and efficiency of the design structure can be improved.

8 Claims, 7 Drawing Sheets

(56) References Cited

U.S. PATENT DOCUMENTS

| | | | |
|---|---|---|---|
| 2005/0149596 A1* | 7/2005 | Jeon et al. | 708/607 |
| 2007/0127412 A1* | 6/2007 | Dent | 370/329 |
| 2007/0159958 A1* | 7/2007 | Ahn | 370/208 |
| 2008/0304600 A1* | 12/2008 | Bottomley | 375/340 |
| 2008/0317141 A1* | 12/2008 | Burg et al. | 375/260 |

OTHER PUBLICATIONS

Eilert, D. Wu, D. Liu, "Efficient complex matrix inversion for MIMO software defined radio," Proc. ISCAS'07, May 2007, pp. 2610-2613.*

Ali Irturk, Bridget Benson, Shahnam Mirzaei and Ryan Kastner, "GUSTO: An Automatic Generation and Optimization Tool for Matrix Inversion Architectures", ACM Transactions on Embedded Computing Systems, Mar. 2010.*

Jung Hoon Lee, Jin Lee, and Sin-Chong Park, "VLSI implementation for interpolation-based matrix inversion for MIMO-OFDM receivers", Proceedings of the 6th WSEAS International Conference on Instrumentation, Measurement, Circuits and Systems, Apr. 2007, pp. 24-27.*

\* cited by examiner

ROW-VECTOR NORM COMPARISON METHOD AND ROW-VECTOR NORM COMPARISON APPARATUS FOR INVERSE MATRIX

CROSS-REFERENCE TO RELATED APPLICATION

This application claims priority to and the benefit of Korean Patent Application No. 10-2007-0133663 filed in the Korean Intellectual Property Office on Dec. 18, 2007, the entire contents of which are incorporated herein by reference.

BACKGROUND OF THE INVENTION (a) Field of the Invention

The present invention relates to a row-vector norm comparison method and a row-vector norm comparison apparatus for an inverse matrix. In particular, the present invention relates to a row-vector norm comparison method and a row-vector norm comparison apparatus for an inverse matrix of a 4×4 matrix for design of a multiple antenna system.

(b) Description of the Related Art

In a mobile communication system, a base station and a terminal transmit/receive a call with multiple antennas, thereby improving signal reliability. The multiple antenna system that transmits/receives a call with the multiple antenna may be designed by using a 4×4 matrix.

The multiple antenna system designed with the 4×4 matrix requires row-vector norm comparison for an inverse matrix in order to execute a detection algorithm for transmitted/received signal prediction.

To this end, a method that calculates an inverse matrix of the 4×4 matrix constituting the multiple antenna system, and performs the row-vector norm comparison for the inverse matrix based on the calculation result, has been used.

To calculate the inverse matrix of the 4×4 matrix requires many operations and the structure becomes complex, which makes it difficult to design a multiple antenna system. In order to solve this problem, various studies on technology and systems capable of easily calculating the inverse matrix of the 4×4 matrix with a simple operation structure have been undertaken.

However, there has been no suggested system that performs row-vector norm comparison for an inverse matrix directly from the 4×4 matrix constituting the multiple antenna system.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a row-vector norm comparison apparatus and a row-vector norm comparison method for an inverse matrix that is capable of performing row-vector norm comparison for an inverse matrix directly from a 4×4 matrix used to design a multiple antenna system, thereby simplifying a design structure.

An exemplary embodiment of the present invention provides a row-vector norm comparison apparatus for an inverse matrix that performs row-vector norm comparison for an inverse matrix of a matrix. The row-vector norm comparison apparatus includes: an input matrix processing module that receives constituent elements of the matrix and combines the input constituent elements; a cofactor operation module that multiplexes the combination result of the constituent elements output from the input matrix processing module to calculate factors constituting an adjoint matrix of the matrix; a square calculation module that squares the factors output from the cofactor operation module; a summation module that selects a predetermined number of factors among the squared factors and sums the selected factors to calculate the norms of row-vectors in the inverse matrix; and a norm comparison module that compares the row-vector norms calculated by the summation module and outputs the comparison result.

Another embodiment of the present invention provides a row-vector norm comparison method for an inverse matrix that performs row-vector norm comparison for an inverse matrix of a matrix. The row-vector norm comparison method includes: receiving constituent elements of the matrix and combining the input constituent elements to generate a plurality of combination results of the constituent elements; multiplexing the plurality of combination results of the constituent elements to calculate factors constituting an adjoint matrix of the matrix; squaring the calculated factors and selectively summing the squared factors to calculate the norm of each row-vector of the inverse matrix; and comparing the calculated row-vector norms and outputting the comparison result.

According to the embodiments of the present invention, the multiple antenna system that requires row-vector norm comparison for an inverse matrix can be implemented with a simple design structure, without fully designing an inverse matrix operation structure that causes complexity and difficulty in design. Therefore, it is not necessary to use an existing complex operation method. In addition, low power consumption of the multiple antenna system can be achieved, and efficiency of the design structure can be improved.

DETAILED DESCRIPTION OF THE EMBODIMENTS

Figure 1:
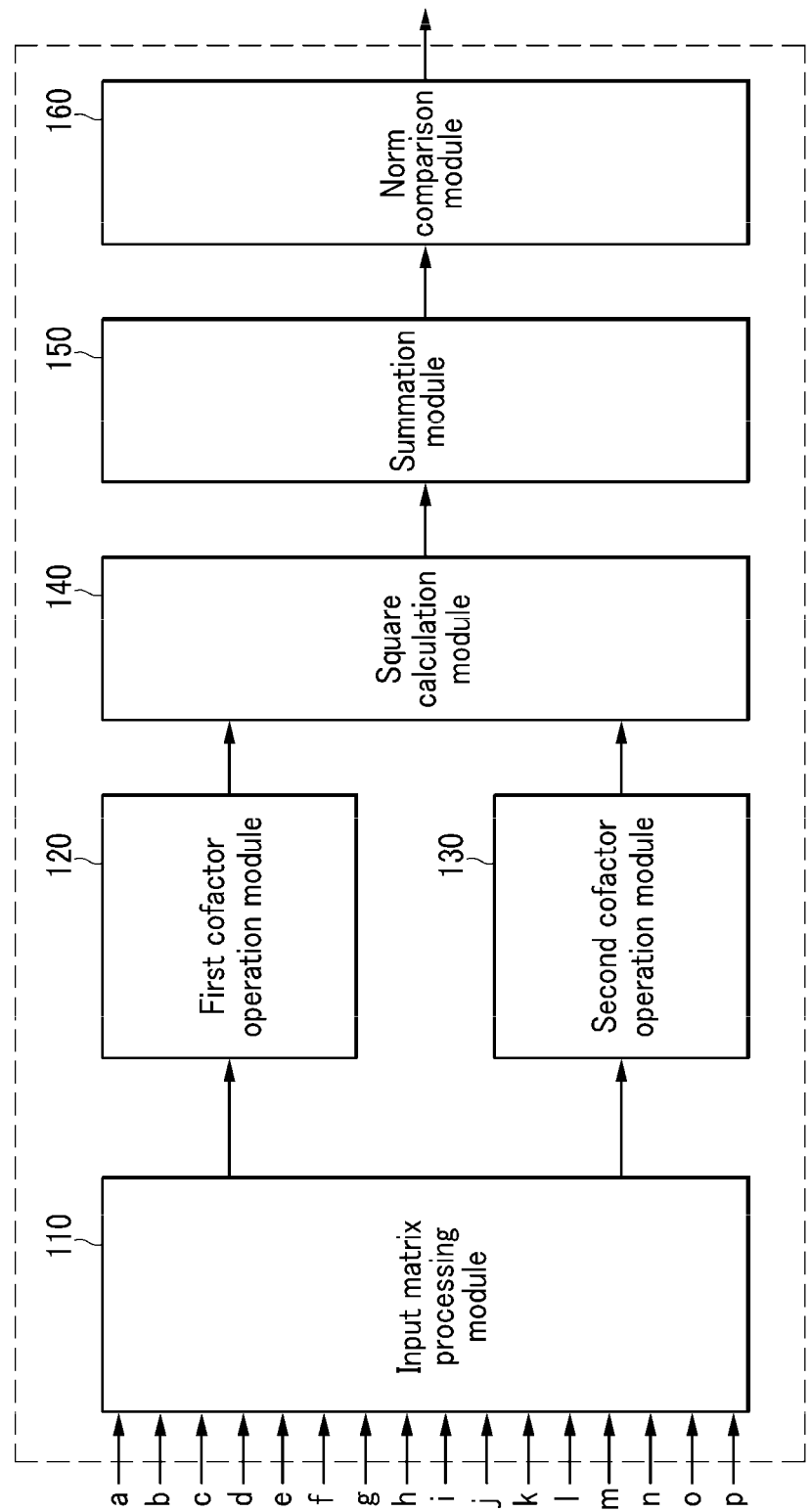
FIG. 1 is a block diagram schematically illustrating a row-vector norm comparison apparatus according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements. The terms "-er", "-or", and "module" described in the specification mean units for processing at least one function and operation and can be implemented by hardware components, and combinations of hardware components and software components.

Assuming a 4×4 input matrix according to an exemplary embodiment of the present invention is A, the matrix A may be expressed by Equation 1.

$$A = \begin{bmatrix} a & b & c & d \\ e & f & g & h \\ i & j & k & l \\ m & n & o & p \end{bmatrix} \quad \text{(Equation 1)}$$

An inverse matrix $A^{-1}$ of the matrix A having elements a to p may be expressed by Equation 2.

$$A^{-1} = \frac{1}{\det(A)} adj(A) \quad \text{(Equation 2)}$$

Here, adj(A) is an adjoint matrix of the matrix A, and det(A) is a determinant of the matrix A. The elements of the inverse matrix $A^{-1}$ are all multiplied by $$\frac{1}{\det(A)}.$$

Therefore, there is no affect on row-vector norm comparison for an inverse matrix according to an exemplary embodiment of the present invention. For this reason, what is necessary for row-vector norm comparison for an inverse matrix according to an exemplary embodiment of the present invention is to calculate the adjoint matrix adj(A).

The adjoint matrix adj(A) is a transpose matrix of a cofactor matrix $c_{ij}$. Accordingly, if the cofactor matrix is calculated, it is possible to calculate a row vector of an inverse matrix. Here, the adjoint matrix adj(A) may be expressed by Equation 3.

$$adj(A) = \begin{bmatrix} +c_{11} & -c_{21} & +c_{31} & -c_{41} \\ -c_{12} & +c_{22} & -c_{32} & +c_{42} \\ +c_{13} & -c_{23} & +c_{33} & -c_{43} \\ -c_{14} & +c_{24} & -c_{34} & +c_{44} \end{bmatrix} \quad \text{(Equation 3)}$$

In the adjoint matrix adj(A), what is necessary is for row-vector norm comparison of an inverse matrix to compare the norms of the row vectors expressed by Equations 4 to 7.

$$\text{Norm of First Row Vector} = c_{11}^2 + c_{21}^2 + c_{31}^2 + c_{41}^2 \quad \text{(Equation 4)}$$

$$\text{Norm of Second Row Vector} = c_{12}^2 + c_{22}^2 + c_{32}^2 + c_{42}^2 \quad \text{(Equation 5)}$$

$$\text{Norm of Third Row Vector} = c_{13}^2 + c_{23}^2 + c_{33}^2 + c_{43}^2 \quad \text{(Equation 6)}$$

$$\text{Norm of Fourth Row Vector} = c_{14}^2 + c_{24}^2 + c_{34}^2 + c_{44}^2 \quad \text{(Equation 7)}$$

That is, what is necessary for row-vector norm comparison for an inverse matrix according to an exemplary embodiment of the present invention is to calculate $c_{11}^2$, $c_{12}^2$, $c_{13}^2$, $c_{14}^2$, $c_{21}^2$, $c_{22}^2$, $c_{23}^2$, $c_{24}^2$, $c_{31}^2$, $c_{32}^2$, $c_{33}^2$, $c_{34}^2$, $c_{41}^2$, $c_{42}^2$, $c_{43}^2$, and $c_{44}^2$.

Here, cofactors constituting the adjoint matrix adj(A), that is, $c_{11}$ to $c_{44}$, may be calculated by Equation 8.

$$c_{11} = \begin{vmatrix} f & g & h \\ j & k & l \\ n & o & p \end{vmatrix} = f \begin{vmatrix} k & l \\ o & p \end{vmatrix} - g \begin{vmatrix} j & l \\ n & p \end{vmatrix} + h \begin{vmatrix} j & k \\ n & o \end{vmatrix} = \quad \text{(Equation 8)}$$

$$f(kp - lo) - g(jp - nl) + h(jo - kn)$$

$$c_{12} = \begin{vmatrix} e & g & h \\ i & k & l \\ m & o & p \end{vmatrix} = e \begin{vmatrix} k & l \\ o & p \end{vmatrix} - g \begin{vmatrix} i & l \\ m & p \end{vmatrix} + h \begin{vmatrix} i & k \\ m & o \end{vmatrix} =$$

$$e(kp - lo) - g(ip - ml) + h(io - km)$$

$$c_{13} = \begin{vmatrix} e & f & h \\ i & j & l \\ m & n & p \end{vmatrix} = e \begin{vmatrix} j & l \\ n & p \end{vmatrix} - f \begin{vmatrix} i & l \\ m & p \end{vmatrix} + h \begin{vmatrix} i & j \\ m & n \end{vmatrix} =$$

$$e(jp - nl) - f(ip - ml) + h(in - jm)$$

$$c_{14} = \begin{vmatrix} e & f & g \\ i & j & k \\ m & n & o \end{vmatrix} = e \begin{vmatrix} j & k \\ n & o \end{vmatrix} - f \begin{vmatrix} i & k \\ m & o \end{vmatrix} + g \begin{vmatrix} i & j \\ m & n \end{vmatrix} =$$

$$e(jo - nk) - f(io - mk) + g(in - jm)$$

$$c_{21} = \begin{vmatrix} b & c & d \\ j & k & l \\ n & o & p \end{vmatrix} = b \begin{vmatrix} k & l \\ o & p \end{vmatrix} - c \begin{vmatrix} j & l \\ n & p \end{vmatrix} + d \begin{vmatrix} j & k \\ n & o \end{vmatrix} =$$

$$b(kp - lo) - c(jp - nl) + d(jo - kn)$$

$$c_{22} = \begin{vmatrix} a & c & d \\ i & k & l \\ m & o & p \end{vmatrix} = a \begin{vmatrix} k & l \\ o & p \end{vmatrix} - c \begin{vmatrix} i & l \\ m & p \end{vmatrix} + d \begin{vmatrix} i & k \\ m & o \end{vmatrix} =$$

$$a(kp - lo) - c(ip - ml) + d(io - km)$$

$$c_{23} = \begin{vmatrix} a & b & d \\ i & j & l \\ m & n & p \end{vmatrix} = a \begin{vmatrix} j & l \\ n & p \end{vmatrix} - b \begin{vmatrix} i & l \\ m & p \end{vmatrix} + d \begin{vmatrix} i & j \\ m & n \end{vmatrix} =$$

$$a(jp - nl) - b(ip - ml) + d(in - jm)$$

$$c_{24} = \begin{vmatrix} a & b & c \\ i & j & k \\ m & n & o \end{vmatrix} = a \begin{vmatrix} j & k \\ n & o \end{vmatrix} - b \begin{vmatrix} i & k \\ m & o \end{vmatrix} + c \begin{vmatrix} i & j \\ m & n \end{vmatrix} =$$

$$a(jo - nk) - b(io - mk) + c(in - jm)$$

$$c_{31} = \begin{vmatrix} b & c & d \\ f & g & h \\ n & o & p \end{vmatrix} = b \begin{vmatrix} g & h \\ o & p \end{vmatrix} - c \begin{vmatrix} f & h \\ n & p \end{vmatrix} + d \begin{vmatrix} f & g \\ n & o \end{vmatrix} =$$

$$b(gp - ho) - c(fp - nh) + d(fo - gn)$$

$$c_{32} = \begin{vmatrix} a & c & d \\ e & g & h \\ m & o & p \end{vmatrix} = a \begin{vmatrix} g & h \\ o & p \end{vmatrix} - c \begin{vmatrix} e & h \\ m & p \end{vmatrix} + d \begin{vmatrix} e & g \\ m & o \end{vmatrix} =$$

$$a(gp - ho) - c(ep - mh) + d(eo - gm)$$

$$c_{33} = \begin{vmatrix} a & b & d \\ e & f & h \\ m & n & p \end{vmatrix} = a \begin{vmatrix} f & h \\ n & p \end{vmatrix} - b \begin{vmatrix} e & h \\ m & p \end{vmatrix} + d \begin{vmatrix} e & f \\ m & n \end{vmatrix} =$$

$$a(fp - hn) - b(ep - mh) + d(en - fm)$$

-continued $$c_{34} = \begin{vmatrix} a & b & c \\ e & f & g \\ m & n & o \end{vmatrix} = a\begin{vmatrix} f & g \\ n & o \end{vmatrix} - b\begin{vmatrix} e & g \\ m & o \end{vmatrix} + c\begin{vmatrix} e & f \\ m & n \end{vmatrix} =$$

$$a(fo - gn) - b(eo - mg) + c(en - fm)$$

$$c_{41} = \begin{vmatrix} b & c & d \\ f & g & h \\ j & k & l \end{vmatrix} = b\begin{vmatrix} g & h \\ k & l \end{vmatrix} - c\begin{vmatrix} f & h \\ j & l \end{vmatrix} + d\begin{vmatrix} f & g \\ j & k \end{vmatrix} =$$

$$b(gl - hk) - c(fl - jh) + d(fk - gj)$$

$$c_{42} = \begin{vmatrix} a & c & d \\ e & g & h \\ i & k & l \end{vmatrix} = a\begin{vmatrix} g & h \\ k & l \end{vmatrix} - c\begin{vmatrix} e & h \\ i & l \end{vmatrix} + d\begin{vmatrix} e & g \\ i & k \end{vmatrix} =$$

$$a(gl - hk) - c(el - ih) + d(ek - gi)$$

$$c_{43} = \begin{vmatrix} a & b & d \\ e & f & h \\ i & j & l \end{vmatrix} = a\begin{vmatrix} f & h \\ j & l \end{vmatrix} - b\begin{vmatrix} e & h \\ i & l \end{vmatrix} + d\begin{vmatrix} e & f \\ i & j \end{vmatrix} =$$

$$a(fl - hj) - b(el - ih) + d(ej - fi)$$

$$c_{44} = \begin{vmatrix} a & b & c \\ e & f & g \\ i & j & k \end{vmatrix} = a\begin{vmatrix} f & g \\ j & k \end{vmatrix} - b\begin{vmatrix} e & g \\ i & k \end{vmatrix} + c\begin{vmatrix} e & f \\ i & j \end{vmatrix} =$$

$$a(fk - gj) - b(ek - ig) + c(ej - fi)$$

As expressed by Equation 8, the cofactors constituting the adjoint matrix adj(A) may be expressed by the elements of the matrix A. An exemplary embodiment of the present invention provides a row-vector norm comparison apparatus that calculates the cofactors constituting the adjoint matrix adj(A) and compares the norms of the row vectors expressed by Equations 4 to 7 on the basis of the calculated cofactors.

FIG. 1 is a block diagram schematically illustrating a row-vector norm comparison apparatus according to an exemplary embodiment of the present invention.

A row-vector norm comparison apparatus according to an exemplary embodiment of the present invention includes an input matrix processing module 110, a first cofactor operation module 120, a second cofactor operation module 130, a square calculation module 140, a summation module 150, and a norm comparison module 160.

The input matrix processing module 110 transmits input constituent elements of a matrix to the first cofactor operation module 120 and the second cofactor operation module 130. The function of the input matrix processing module 110 will be described with reference to FIG. 2.

Figure 2:
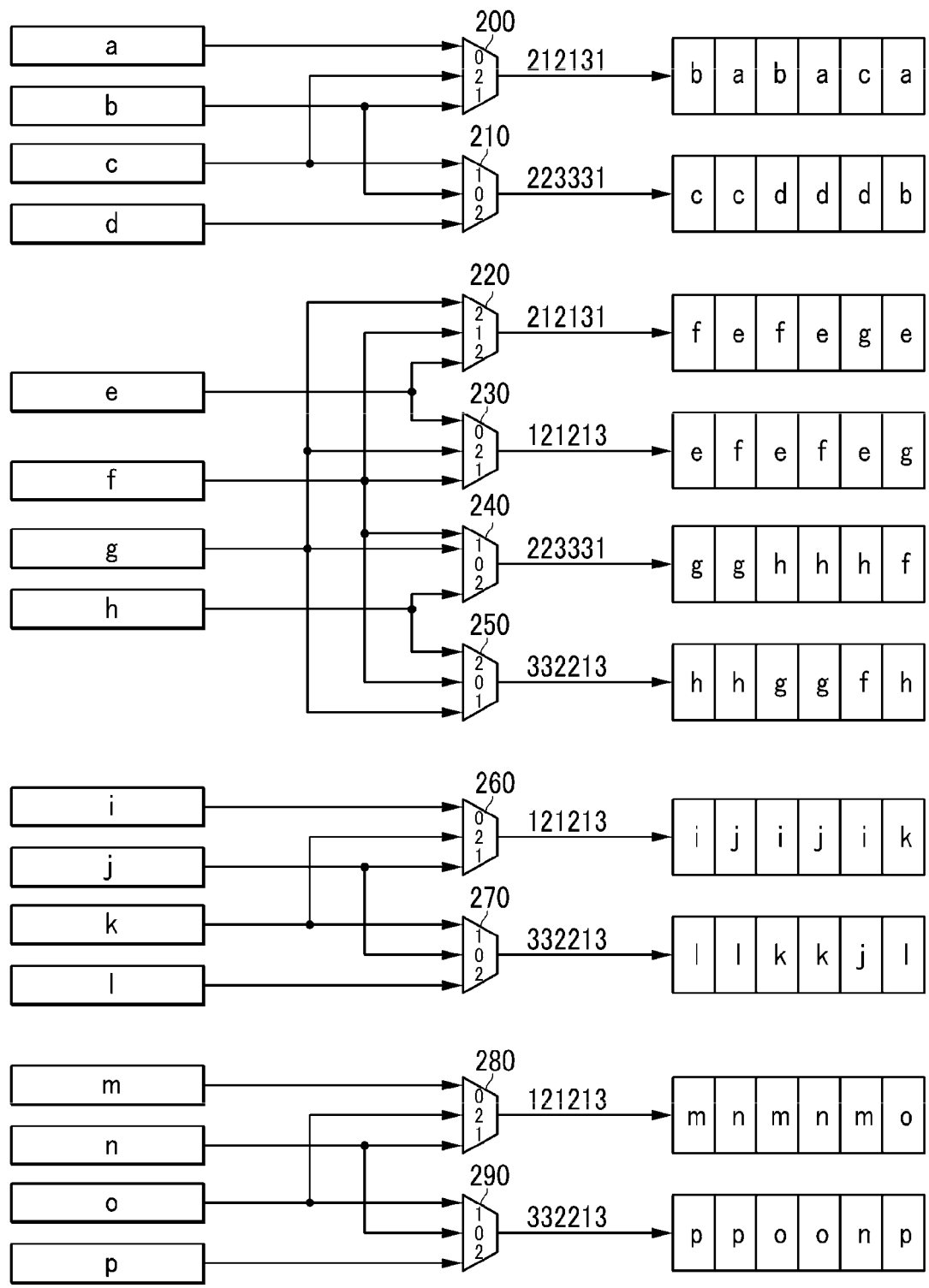
FIG. 2 is a diagram schematically illustrating the internal configuration for explaining a function of an input matrix processing module according to an exemplary embodiment of the present invention.

FIG. 2 is a diagram schematically illustrating the internal configuration for explaining a function of an input matrix processing module according to an exemplary embodiment of the present invention.

The input matrix processing module 110 according to an exemplary embodiment of the present invention includes a plurality of multiplexers. According to an exemplary embodiment of the present invention, the input matrix processing module 110 that processes a 4×4 matrix includes 10 multiplexers.

The elements a, b, c, and d constituting the first row vector in the matrix A expressed by Equation 1 are input to a first multiplexer 200 and a second multiplexer 210. The first multiplexer 200 receives the elements a, b, and c and outputs "babaca" (hereinafter referred to as "first output"), and the second multiplexer 210 receives the elements b, c, and d and outputs "ccdddb" (hereinafter referred to as "second output").

The elements e, f, g, and h constituting the second row vector are input to a third multiplexer 220, a fourth multiplexer 230, a fifth multiplexer 240, and a sixth multiplexer 250. The third multiplexer 220 and the fourth multiplexer 230 receive the elements e, f, and g, and the fifth multiplexer 240 and the sixth multiplexer 250 receive the elements f, g, and h.

Accordingly, the third multiplexer 220 outputs "fefege" (hereinafter referred to as "third output"), and the fourth multiplexer 230 outputs "efefeg" (hereinafter referred to as "fourth output"). In addition, the fifth multiplexer 240 outputs "gghhhf" (hereinafter referred to as "fifth output"), and the sixth multiplexer 250 outputs "hhggfh" (hereinafter referred to as "sixth output").

The elements i, j, k, and l constituting the third row vector are input to a seventh multiplexer 260 and an eighth multiplexer 270. The seventh multiplexer 260 receives the elements i, j, and k and outputs "ijijik" (hereinafter referred to as "seventh output"), and the eighth multiplexer 270 receives the elements j, k, and l and outputs "llkkjl" (hereinafter referred to as "eighth output").

The elements m, n, o, and p constituting the fourth row vector are input to a ninth multiplexer 280 and a tenth multiplexer 290. The ninth multiplexer 280 receives the elements m, n, and o and outputs "mnmnmo" (hereinafter referred to as "ninth output"), and the tenth multiplexer 290 receives the elements n, o, and p and outputs "ppoonp" (hereinafter referred to as "tenth output").

As described above, the input matrix processing module 110 that receives the matrix A having the constituent elements expressed by Equation 1 can output the first to tenth outputs to the first cofactor operation module 120 and the second cofactor operation module 130 through a plurality of multiplexers.

The first cofactor operation module 120 and the second cofactor operation module 130 calculate the cofactors constituting the adjoint matrix adj(A), that is, $c_{11}$ to $c_{44}$, on the basis of the first to tenth outputs from the input matrix processing module 110. The first cofactor operation module 120 calculates the cofactors $c_{11}$ to $c_{24}$, and the second cofactor operation module 130 calculates the cofactors $c_{31}$ to $c_{44}$.

The structures and functions of the first cofactor operation module 120 and the second cofactor operation module 130 that calculate the cofactors will be described with reference to FIGS. 3 and 6.

Figure 3:
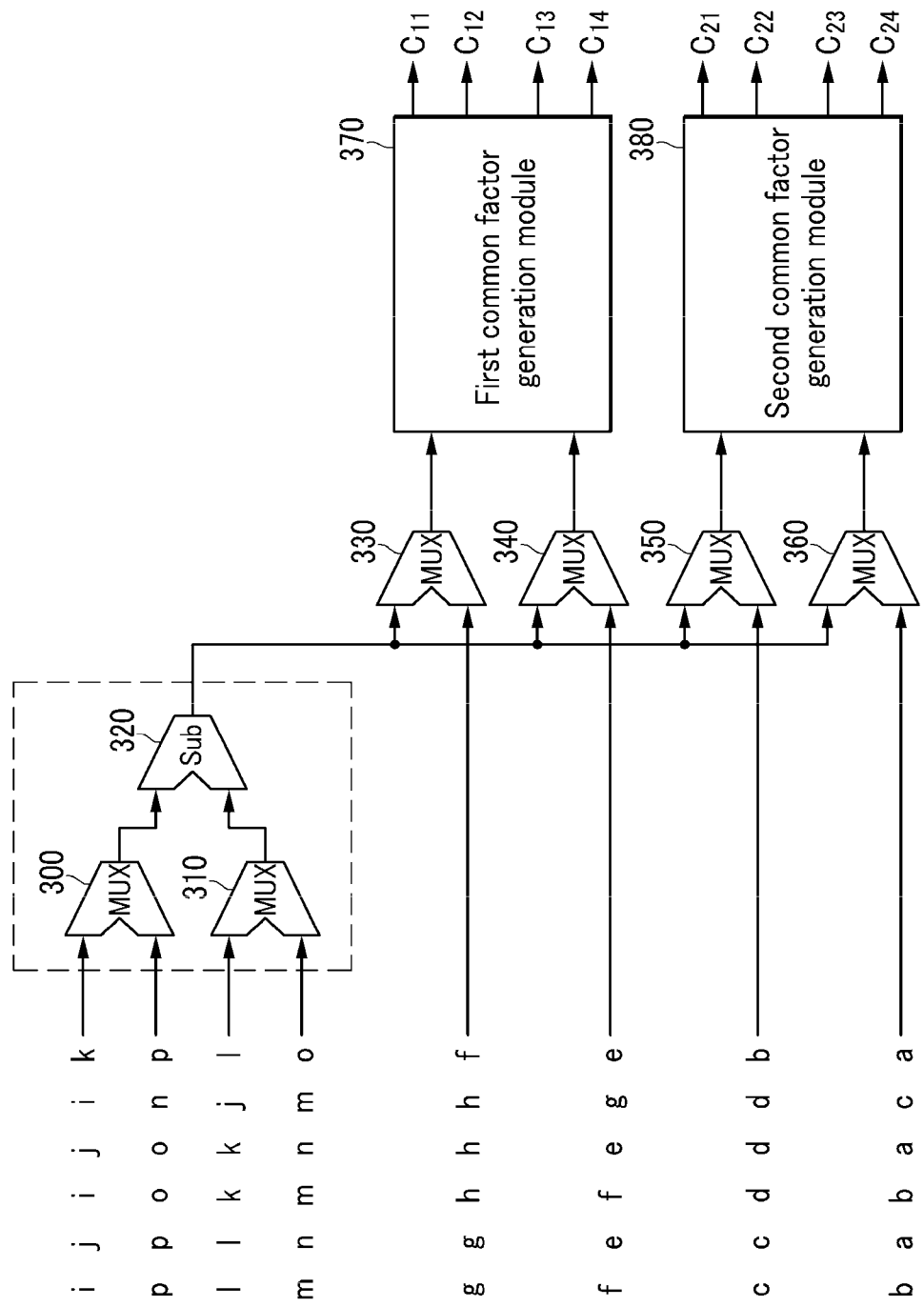
FIG. 3 is a diagram schematically illustrating the internal configuration of a first cofactor operation module according to an exemplary embodiment of the present invention.

FIG. 3 is a diagram schematically illustrating the internal configuration of a first cofactor operation module according to an exemplary embodiment of the present invention.

The first cofactor operation module 120 according to an exemplary embodiment of the present invention receives the first to third outputs, the fifth output, and the seventh to tenth outputs from the input matrix processing module 110, and calculates the cofactors $c_{11}$ to $c_{24}$ from the first to third outputs, the fifth output, and the seventh to tenth outputs.

For this purpose, the first cofactor operation module 120 according to an exemplary embodiment of the present invention includes a plurality of multiplexers 300, 310, 330, 340, 350, and 360, a subtractor 320, and two common factor generation modules 370 and 380.

The eleventh multiplexer 300 receives the seventh output (ijijik) and the tenth output (ppoonp) from the input matrix processing module 110 and multiplexes them. In the description of the present invention, assuming the output of the eleventh multiplexer 300 is an eleventh output, the eleventh output becomes (ip jp io jo in kp).

The twelfth multiplexer 310 receives the eighth output (llkkjl) and the ninth output (mnmnmo) from the input matrix processing module 110 and multiplexes them. In the description of the present invention, assuming the output of the twelfth multiplexer 310 is a twelfth output, the twelfth output becomes (lm ln km kn jm lo).

The first subtractor 320 subtracts the cofactors, which are transmitted from the twelfth multiplexer 310, from the cofactors, which are transmitted from the eleventh multiplexer 300. Accordingly, assuming the output of the first subtractor 320 is a thirteenth output, the thirteenth output becomes (ip–lm jp–ln io–km jo–kn in–jm kp–lo). The first subtractor 320 transmits the thirteenth output to the thirteenth multiplexer 330 to the sixteenth multiplexer 360.

The thirteenth multiplexer 330 receives the thirteenth output (ip–lm jp–ln io–km jo–kn in–jm kp–lo) from the first subtractor 320 and the fifth output (gghhhf), multiplexes them, and transmits the multiplexing result (fourteenth output) to the first common factor generation module 370.

The fourteenth multiplexer 340 receives the thirteenth output (ip–lm jp–ln io–km jo–kn in–jm kp–lo) from the first subtractor 320 and the third output (fefege), multiplexes them, and transmits the multiplexing result (fifteenth output) to the first common factor generation module 370.

The fifteenth multiplexer 350 receives the thirteenth output (ip–lm jp–ln io–km jo–kn in–jm kp–lo) from the first subtractor 320 and the second output (ccdddb), multiplexes them, and transmits the multiplexing result (sixteenth output) to the second common factor generation module 380.

The sixteenth multiplexer 360 receives the thirteenth output (ip–lm jp–ln io–km jo–kn in–jm kp–lo) from the first subtractor 320 and the first output (babaca), multiplexes them, and transmits the multiplexing result (seventeenth output) to the second common factor generation module 380.

The first common factor generation module 370 sums the fourteenth output and the fifteenth output to calculate common factors, and according to the calculation result, calculates the cofactors $c_{11}$ to $c_{14}$.

The second common factor generation module 380 sums the sixteenth output and the seventeenth output to calculate common factors, and according to the calculation result, calculates the cofactors $c_{21}$ to $c_{24}$.

Figure 4:
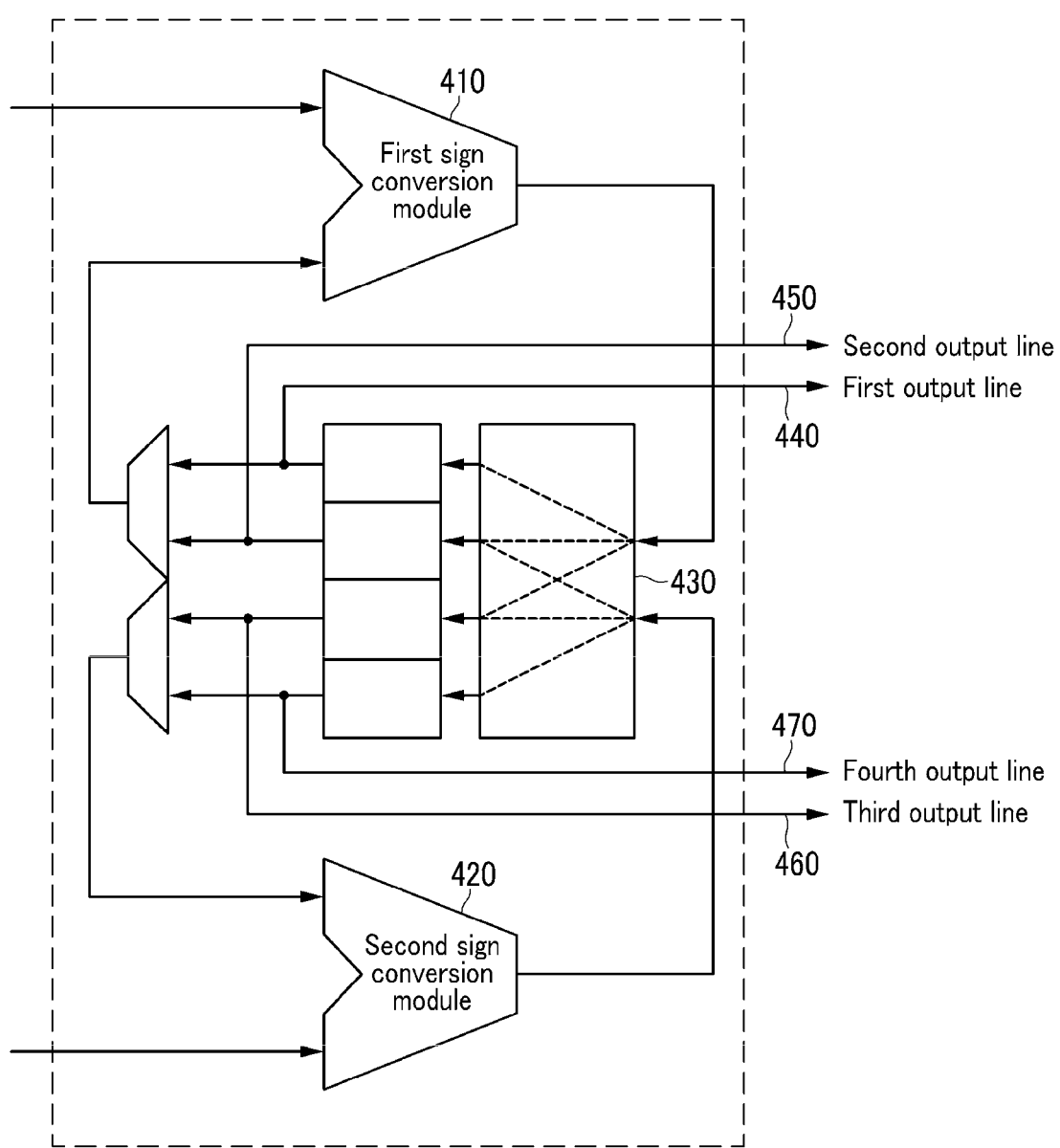
FIG. 4 is a diagram schematically illustrating the internal configuration of a common factor generation module according to an exemplary embodiment of the present invention.

The internal structures of the first common factor generation module 370 and the second common factor generation module 380 are as shown in FIG. 4.

FIG. 4 is a diagram schematically illustrating the internal configuration of a common factor generation module according to an exemplary embodiment of the present invention.

A common factor generation module includes a first sign conversion module 410, a second sign conversion module 420, an output line selection module 430, and four output lines 440 to 470.

The first sign conversion module 410 and the second sign conversion module 420 perform sign conversion by inverting the input factors and transmit the inverted factors to the output line selection module 430, or transmit the factors to the output line selection module 430 as they are, without performing sign conversion.

The output line selection module 430 selects output lines to which the factors from the first sign conversion module 410 and the second sign conversion module 420 are output. According to an output line is selected by the output line selection module 430, the outputs required for calculating the cofactors $c_{11}$ to $c_{14}$ can be selected.

The first output line 440 to the fourth output line 470 sum one or more outputs to be transmitted according to the selection by the output line selection module 430, and transmit the summation result to the square calculation module 140.

Figure 5:
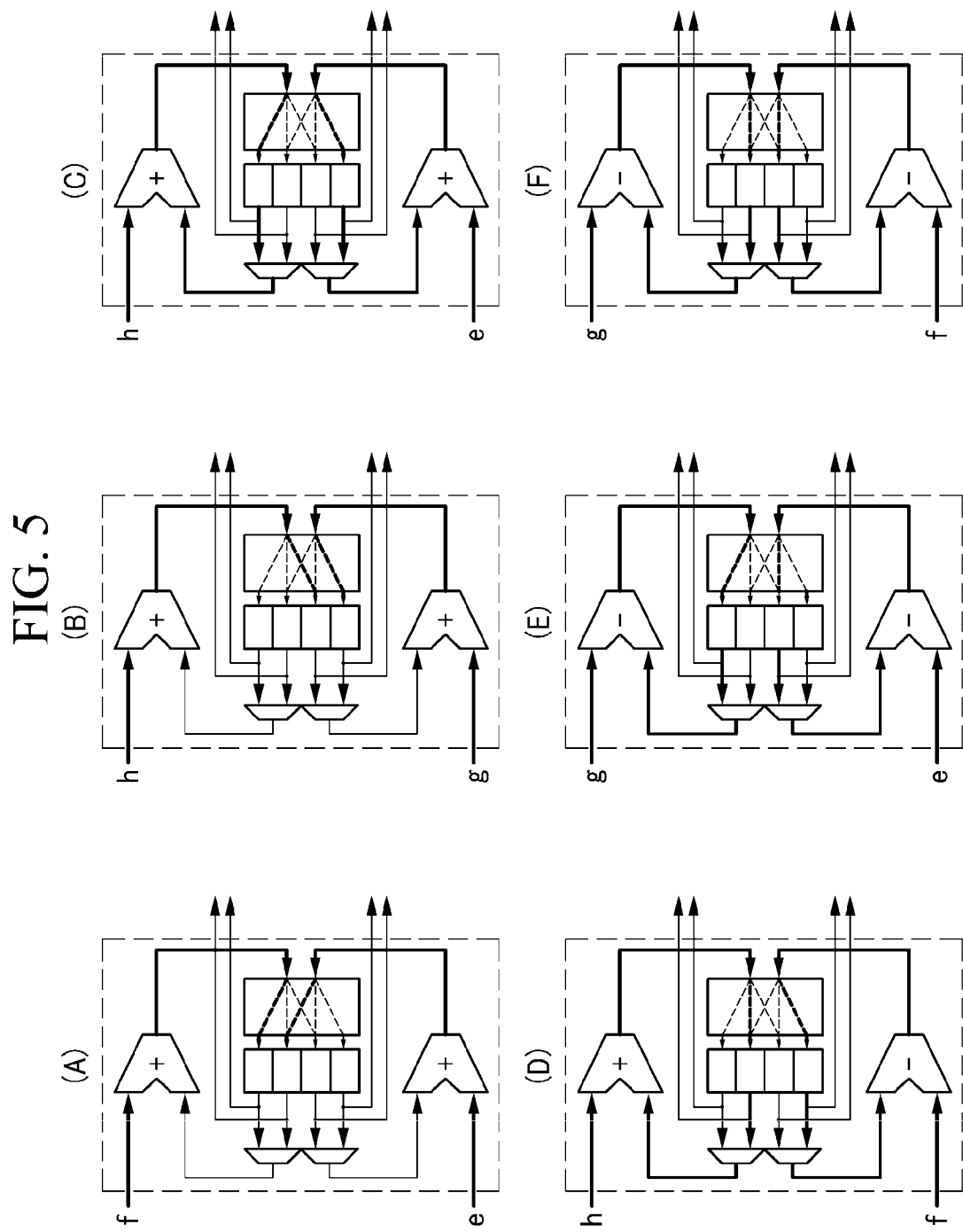
FIG. 5 is shows diagrams illustrating the internal configurations of first common factor generation modules for calculating cofactors $c_{11}$ to $c_{14}$ adapted in various ways based on kinds of input factors according to an exemplary embodiment of the present invention.

FIG. 5 shows diagrams illustrating the internal configurations of first common factor generation modules for calculating cofactors $c_{11}$ to $c_{14}$ adapted in various ways based on kinds of input factors according to an exemplary embodiment of the present invention.

In (A) of FIG. 5, the element f(kp–lo) is input to the first sign conversion module 410, and the element e(kp–lo) is input to the second sign conversion module 420. The first sign conversion module 410 and the second sign conversion module 420 do not perform sign conversion, and according to the selection by the output line selection module 430, f(kp–lo) is output to the first output line 440 and e(kp–lo) is output to the second output line 450.

In (B) of FIG. 5, the element h(in–jm) is input to the first sign conversion module 410, and the element g(in–jm) is input to the second sign conversion module 420. The first sign conversion module 410 and the second sign conversion module 420 do not perform sign conversion, and according to the selection by the output line selection module 430, h(in–jm) is output to the third output line 460 and g(in–jm) is output to the fourth output line 470.

In (C) of FIG. 5, the element h(jo–kn) is input to the first sign conversion module 410, and the element e(jo–kn) is input to the second sign conversion module 420. The first sign conversion module 410 and the second sign conversion module 420 do not perform sign conversion, and according to the selection by the output line selection module 430, h(jo–kn) is output to the first output line 440 and e(jo–kn) is output to the fourth output line 470.

In (D) of FIG. 5, the element h(jo–km) is input to the first sign conversion module 410, and the element f(io–km) is input to the second sign conversion module 420. In this case, while the first sign conversion module 410 does not perform sign conversion, the second sign conversion module 420 does perform sign conversion. Accordingly, h(io–km) is output to the second output line 450, and –f(io–km) is output to the fourth output line 470.

With the internal configuration of the first common factor generation module 370, in (E) of FIG. 5, –g(jp–ln) is output to the first output line 440, and e(jp–ln) is output to the third output line 460. In addition, in (F) of FIG. 5, –g(ip–lm) is output to the second output line 450, and –f(ip–lm) is output to the third output line 460.

With the output results, each output line has the output result expressed by Equation 9.

First Output Line=$f(kp-lo)+h(jo-kn)-g(jp-ln)$

Second Output Line=$e(kp-lo)+h(io-km)-g(ip-lm)$

Third Output Line=$h(in-jm)+e(jp-ln)-f(ip-lm)$

Fourth Output Line=$g(in-jm)+e(jo-kn)-f(io-km)$   (Equation 9)

Comparing the output results of the output lines expressed by Equation 9 with the cofactors of the adjoint matrix adj(A) calculated by Equation 8, the following can be seen: the output result of the first output line 440 is identical to the cofactor $c_{11}$; the output result of the second output line 450 is identical to the cofactor $c_{12}$; the output result of the third output line 460 is identical to the cofactor $c_{13}$; and the output result of the fourth output line 470 is identical to the cofactor $c_{14}$.

That is, according to an exemplary embodiment of the present invention, the first common factor generation module 370 outputs the cofactors $c_{11}$ to $c_{14}$ through the output lines.

It can be seen that the second common factor generation module 380 having the same configuration as that of the first common factor generation module 370 outputs $c_{21}$ to $c_{24}$ through the output lines.

The outputs of the first common factor generation module 370 and the outputs of the second common factor generation module 380 become the outputs of the first cofactor operation module 120. Accordingly, it can be seen that the outputs of the first cofactor operation module 120 are the cofactors $c_{11}$ to $c_{24}$.

Figure 6:
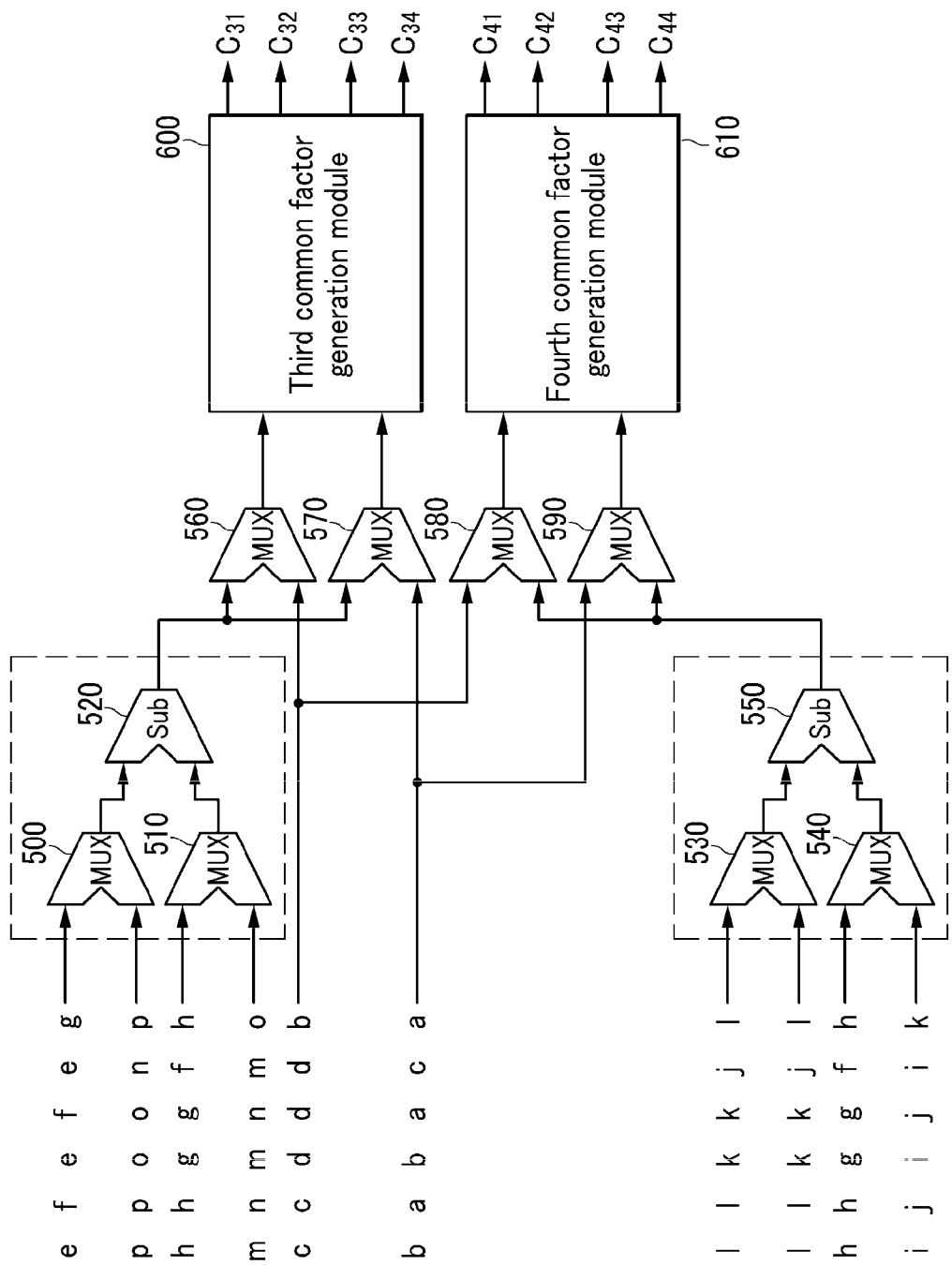
FIG. 6 is a diagram schematically illustrating the internal configuration of a second cofactor operation module according to an exemplary embodiment of the present invention.

FIG. 6 is a diagram schematically illustrating the internal configuration of a second cofactor operation module according to an exemplary embodiment of the present invention.

The second cofactor operation module 130 according to an exemplary embodiment of the present invention receives the first and second outputs, the fourth output, and the sixth to tenth outputs from the input matrix processing module 110, and calculates the cofactors $c_{31}$ to $c_{44}$ from the first and second outputs, the fourth output, and the sixth to tenth outputs.

For this purpose, the second cofactor operation module 130 according to an exemplary embodiment of the present invention includes a plurality of multiplexers 500, 510, 530, 540, 560, 560, 580, and 590, two subtractors 520 and 550, and two common factor generation modules 600 and 610.

The seventeenth multiplexer 500 receives the fourth output (efefeg) and the tenth output (ppoonp) from input matrix processing module 110, and multiplexes them to generate an eighteenth output (ep fp eo fo en gp).

The eighteenth multiplexer 510 receives the sixth output (hhggfh) and the tenth output (mnmnmo) from the input matrix processing module 110, and multiplexes them to generate a nineteenth output (hm hn gm gn fm ho).

The second subtractor 520 subtracts the cofactors that are transmitted from the eighteenth multiplexer 510 from the cofactors that are transmitted from the seventeenth multiplexer 500. The output of the second subtractor 520, that is, a twentieth output (ep–hm fp–hn eo–gm fo–gn en–fm gp–ho), is transmitted to the twenty-first multiplexer 560 and the twenty-second multiplexer 570.

The nineteenth multiplexer 530 receives the fourth output (efefeg) and the eighth output (llkkjl) from the input matrix processing module 110, and multiplexes them to generate a twenty-first output (el fl ek fk ej gl).

The twentieth multiplexer 540 receives the sixth output (hhggfh) and the seventh output (ijijik) from the input matrix processing module 110, and multiplexes them to generate a twenty-second output (hi hj gi gj fi hk).

The third subtractor 550 subtracts the cofactors that are transmitted from the twentieth multiplexer 540 from the cofactors that are transmitted from the nineteenth multiplexer 530. The output of the third subtractor 550, that is, a twenty-third output (el–hi fl–hj ek–gi fk–gj ej–fi gl–hk), is transmitted to the twenty-third multiplexer 580 and the twenty-fourth multiplexer 590.

The twenty-first multiplexer 560 receives the twentieth output (ep–hm fp–hn eo–gm fo–gn en–fm gp–ho) from the second subtractor 520 and the second output (ccdddb), multiplexes them, and transmits the multiplexing result (twenty-fourth output) to the third common factor generation module 600.

The twenty-second multiplexer 570 receives the twentieth output (ep–hm fp–hn eo–gm fo–gn en–fm gp–ho) from the second subtractor 520 and the first output (babaca), multiplexes them, and transmits the multiplexing result (twenty-fifth output) to the third common factor generation module 600.

The twenty-third multiplexer 580 receives the twenty-third output (el–hi fl–hj ek–gi fk–gj ej–fi gl–hk) from the third subtractor 520 and the second output (ccdddb), multiplexes them, and transmits the multiplexing result (twenty-sixth output) to the fourth common factor generation module 610.

The twenty-fourth multiplexer 590 receives the twenty-third output (el–hi fl–hj ek–gi fk–gj ej–fi gl–hk) from the third subtractor 520 and the first output (babaca), multiplexes them, and transmits the multiplexing result (twenty-seventh output) to the fourth common factor generation module 610.

The third common factor generation module 600 sums the twenty-fourth output and the twenty-fifth output to calculate common factors, and according to the calculation result, calculates the cofactors $c_{31}$ to $c_{34}$.

The fourth common factor generation module 610 sums the twenty-sixth output and the twenty-seventh output to calculate common factors, and according to the calculation result, calculates the cofactors $c_{41}$ to $c_{44}$.

The third common factor generation module 600 and the fourth common factor generation module 610 have the same internal structure and function as the first common factor generation module 370 and the second common factor generation module 380 shown in FIGS. 4 and 5A to 5F, and thus detailed descriptions thereof will be omitted.

It can be seen that the cofactors $c_{31}$ to $c_{44}$ are output from the second cofactor operation module 130.

The cofactors $c_{11}$ to $c_{24}$ output through the output lines of the first cofactor operation module 120 shown in FIG. 3 are input to the square calculation module 140.

The cofactors $c_{31}$ to $c_{44}$ output through the output lines of the second cofactor operation module 130 shown in FIG. 6 are also input to the square calculation module 140.

The square calculation module 140 squares the factors transmitted through the output lines, and transmits the squared factors to the summation module 150. At this time, the square calculation module 140 independently processes the factors transmitted from the common factor generation modules 370, 380, 600, and 610, and transmits the processing results to the summation module 150.

That is, the square calculation module 140 receives and squares the cofactors $c_{11}$ to $c_{14}$ transmitted from the first common factor generation module 370 of the first cofactor operation module 120, and transmits the squared factors $c_{11}^2$ to $c_{14}^2$ to the summation module 150 as a twenty-eighth output. In addition, the square calculation module 140 receives and squares the cofactors $c_{21}$ to $c_{24}$ transmitted from the second common factor generation module 380, and transmits the squared factors $c_{21}^2$ to $c_{24}^2$ to the summation module 150 as a twenty-ninth output.

Also, the square calculation module 140 receives and squares the cofactors $c_{31}$ to $c_{34}$ transmitted from the third common factor generation module 600 of the second cofactor operation module 130, and transmits the squared factors $c_{31}^2$ to $c_{34}^2$ to the summation module 150 as a thirtieth output. In addition, the square calculation module 140 receives and squares the cofactors $c_{41}$ to $c_{44}$ transmitted from the fourth common factor generation module 610, and transmits the squared factors $c_{41}^2$ to $c_{44}^2$ to the summation module 150 as a thirty-first output.

The summation module 150 selects four factors among the square results ($c_{11}^2$ to $c_{14}^2$, $c_{21}^2$ to $c_{24}^2$, $c_{31}^2$ to $c_{34}^2$, and $c_{41}^2$ to $c_{44}^2$) from the square calculation module 140, sums the selected factors, and transmits the summation result to the norm comparison module 160. At this time, the summation module 150 is configured to select the factors at the same position of the twenty-eighth output to the thirty-first output.

For example, the summation module 150 selects the factors $c_{11}, c_{21} c_{31}^2$, and $c_{41}^2$ at the first position of the twenty-eighth output to the thirty-first output from the square calculation module 140, and transmits the summation result ($c_{11}^2+c_{21}^2+c_{31}^2+c_{41}^2$) of the selected factors to the norm comparison module 160 as a thirty-second output.

Also, the summation module 150 selects the factors $c_{12}^2$, $c_{22}^2$, $c_{32}^2$, and $c_{42}^2$ at the second position of the twenty-eighth output to the thirty-first output, and the summation result $(c_{12}^2+c_{22}^2+c_{32}^2+c_{42}^2)$ of the selected factors to the norm comparison module 160 as a thirty-third output.

Similarly, the summation module 150 transmits a thirty-fourth output $(c_{13}^2+c_{23}^2+c_{33}^2+c_{43}^2)$ and a thirty-fifth output $(c_{14}^2+c_{24}^2+c_{34}^2+c_{44}^2)$ to the norm comparison module 160.

It can be seen that the thirty-second output to the thirty-fifth output transmitted to the norm comparison module 160 through the summation module 150 are correspondingly identical to the norms of the row vectors in the adjoint matrix adj(A) expressed by Equations 4 to 7. That is, the thirty-second output is identical to the norm of the first row vector in the adjoint matrix adj(A), and the thirty-third output is identical to the norm of the second row vector therein. In addition, the thirty-fourth output is identical to the norm of the third row vector in the adjoint matrix adj(A), and the twenty-fifth output is identical to the norm of the fourth row vector therein.

Figure 7:
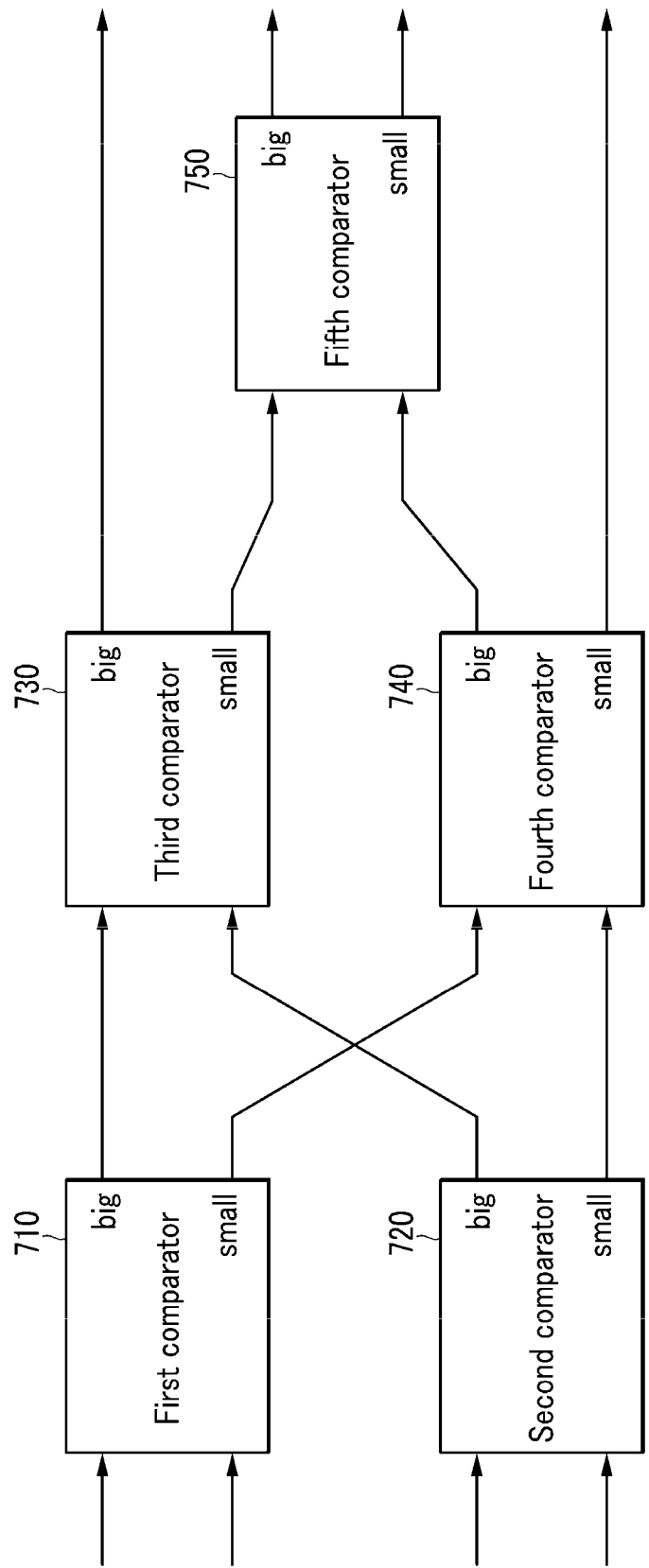
FIG. 7 is a diagram schematically illustrating the internal configuration of a norm comparison module according to an exemplary embodiment of the present invention.

FIG. 7 is a diagram schematically illustrating the internal configuration of a norm comparison module according to an exemplary embodiment of the present invention.

The norm comparison module 160 includes a plurality of comparators. In the row-vector norm comparison apparatus for an inverse matrix of a 4×4 matrix according to an exemplary embodiment of the present invention, the norm comparison module 160 includes, for example, five comparators 710 to 750.

The first comparator 710 receives the thirty-second output and the thirty-third output from the summation module 150, and compares the norms of the first and second row vectors.

The second comparator 720 receives the thirty-fourth output and the thirty-fifth output from the summation module 150, and compares the norms of the third and fourth row vectors.

Although a case in which the first comparator 710 receives and compares the thirty-second output and the thirty-third output, and the second comparator 720 receives and compares the thirty-fourth output and the thirty-fifth output has been described, the first comparator 710 and the second comparator 720 may be adapted such that any of the thirty-second output to the thirty-fifth output are input to the first comparator 710 and the second comparator 720.

The third comparator 730 selects a row vector having the biggest norm by comparing a row vector having a bigger norm according to the comparison result of the first comparator 710 with a row vector having a bigger norm according to the comparison result of the second comparator 710.

The fourth comparator 740 selects a row vector having the smallest norm by comparing a row vector having a smaller norm according to the comparison result of the first comparator 710 with a row vector having a smaller norm according to the comparison result of the second comparator 710.

The fifth comparator 750 selects row vectors having the second biggest norm and the third biggest norm by comparing a row vector having a smaller norm according to the comparison result of the third comparator 730 with a row vector having a bigger norm according to the comparison result of the fourth comparator 740.

With the results of the norm comparison module 160, it is possible to confirm the row-vector norm comparison result for the inverse matrix of the 4×4 matrix.

The embodiment of the present invention described above is not be implemented by only the method and apparatus, but it may be implemented by a program for executing the functions corresponding to the configuration of the exemplary embodiment of the present invention or a recording medium having the program recorded thereon. These implementations can be realized by the ordinarily skilled person in the art from the description of the above-described exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A row-vector norm comparison apparatus for an inverse matrix of a matrix, the apparatus comprising:
at least one controller circuit configured to execute one or more modules, the one or more modules including:
an input matrix processing module that receives constituent elements of the matrix and combines the input constituent elements;
a cofactor operation module that multiplexes the combination result of the constituent elements output from the input matrix processing module to calculate factors constituting an adjoint matrix of the matrix;
a square calculation module that squares the factors output from the cofactor operation module;
a summation module that selects a predetermined number of factors among the squared factors and sums the selected factors to calculate the norms of row-vectors in the inverse matrix; and
a norm comparison module that compares the norms of the row vectors calculated by the summation module and outputs the comparison result,
wherein the cofactor operation module includes:
at least one first multiplexer that receives and multiplexes two combination results of the constituent elements from the input matrix processing module;
at least one subtractor that selects part of the outputs of the first multiplexer and performs subtraction between the selected outputs;
at least one second multiplexer that receives and multiplexes the combination results of the constituent elements from the input matrix processing module and the output of the subtractor; and
at least one common factor generation module that receives the outputs from two multiplexers, and calculates the factors constituting the adjoint matrix of the matrix.

2. The apparatus of claim 1, wherein the input matrix processing module includes a plurality of multiplexers, and generates a plurality of combination results of the constituent elements according to the combinations of the constituent elements of the matrix using the multiplexers and transmits the plurality of combination results of the constituent elements to the cofactor operation module.

3. The apparatus of claim 2, wherein the input matrix processing module receives 16 constituent elements constituting a 4×4 matrix, and outputs 10 combination results of the constituent elements.

4. The apparatus of claim 3, wherein the cofactor operation module includes:
a first cofactor operation module that calculate factors constituting first and second row vectors in the adjoint matrix; and
a second cofactor operation module that calculates factors constituting third and fourth row vectors in the adjoint matrix.

5. The apparatus of claim 1, wherein the common factor generation module includes:
- a sign conversion module that transmits the outputs of the second multiplexers as they are or outputs inverted outputs; and
- an output line selection module that selects an output line to which the factors transmitted from the sign conversion module are output among at least one output line to which the factors constituting the adjoint matrix of the matrix are output.

6. A row-vector norm comparison method for an inverse matrix of a matrix implemented in at least one controller, the method comprising:
- receiving, by the at least one controller, constituent elements of the matrix and combining the input constituent elements to generate a plurality of combination results of the constituent elements;
- multiplexing, by the at least one controller, the plurality of combination results of the constituent elements to calculate factors constituting an adjoint matrix of the matrix;
- squaring, by the at least one controller, the calculated factors;
- selectively summing, by the at least one controller, the squared factors to calculate the norm of each row-vector of the inverse matrix; and
- comparing, by the at least one controller, the calculated row-vector norms and outputting the comparison result, wherein the multiplexing of the combination results includes:
  - selecting, by a multiplexing circuit, two combination results of the constituent elements among the plurality of combination results of the constituent elements and multiplexing the selected combination results of the constituent elements;
  - selecting and subtracting two multiplexed combinations of the constituent elements among the multiplexed combinations of the constituent elements; and
  - multiplexing the combination results of the constituent elements generated in the generating of the combination results and the subtraction result to calculate the factors constituting the adjoint matrix of the matrix.

7. The method of claim 6, wherein the matrix is a 4×4 matrix, and the generating of the combination results includes:
- receiving 16 constituent elements constituting the 4×4 matrix;
- generating 10 combination results of 6 constituent elements among the input 16 constituent elements; and
- outputting the generated 10 combination results of the constituent elements.

8. The method of claim 7, wherein the multiplexing of the combination results includes:
- selecting 8 combination results of the constituent elements among the 10 combination results of the constituent elements and multiplexing the selected 8 combination results of the constituent elements to calculate factors constituting first and second row vectors in the adjoint matrix of the matrix; and
- selecting 8 combination results of the constituent elements among the 10 combination results of the constituent elements and multiplexing the selected 8 combination results of the constituent elements to calculate factors constituting third and fourth row vectors in the adjoint matrix of the matrix.

* * * * *